Patented Mar. 14, 1950

2,500,369

UNITED STATES PATENT OFFICE 2,500,369

PROCESS FOR THE PREPARATION OF DITOLYLETHANE

James A. McCoubrey, Shawinigan Falls, Quebec, and Frederick Pettit Lossing, Hamilton, Ontario, Canada, assignors to Shawinigan Chemicals Limited, Montreal, Quebec, Canada, a corporation of Canada No Drawing. Application September 12, 1947, Serial No. 773,726

8 Claims. (Cl. 260—668)

This invention relates to improvements in a method of preparing 1,1 di-p-tolylethane.

Prior art 1,1 di-p-tolylethane, herein referred to as ditolylethane, has commonly been prepared by the reaction of acetylene with toluene, in the presence of a catalyst such as a mixture of sulfuric acid and mercuric sulfate. The product yields obtainable by this process have been of the order of 65% to 70%, and the reaction has usually been accompanied by the production of considerable amounts of tarry by-products.

Fischer (Ber. 7, 1193 (1874)) outlined a method of preparing dimethylphenylethane (ditolylethane), by the reaction of paraldehyde with toluene. As outlined by Fischer, the method requires the use of excessively large amounts of sulfuric acid which are not recovered. The yields obtained by Fischer are not known, but the general disregard of the process indicates that it has not heretofore produced better yields than any other process for the preparation of ditolylethane.

As described by Fischer, the reaction between paraldehyde and toluene was carried out by adding a stoichiometric amount of toluene to a mixture of paraldehyde and sulfuric acid, containing not more than 1½% paraldehyde. Thus for each mole of ditolylethane there were required nearly 30 moles of sulfuric acid.

The invention

We have discovered certain improvements which make it possible to obtain hitherto unobtainable yields of ditolylethane. Our invention involves the reaction between paraldehyde and toluene, the dehydration being obtained by the maintenance of certain critical dehydrating conditions.

We have found that by using toluene in excess and sulfuric acid of certain critical strength in an altered addition procedure, the amount of acid required to complete the reaction is greatly reduced, and greatly improved yields of ditolylethane are obtained. We have also found that the yield of ditolylethane is improved according to our procedure by maintenance of certain specific conditions of reaction, such as temperature, rate of addition of reactants, ratio of ingredients, and agitation of ingredients.

Objects

It is therefore an object of this invention to produce ditolylethane in high yields by the reaction between paraldehyde and toluene. It is a further object of this invention to carry out the reaction between paraldehyde and toluene with the aid of much smaller amounts of sulfuric acid than have heretofore been considered necessary. Other objects and advantages of the invention will be apparent from the following description.

Detailed description

According to this invention, the reaction between paraldehyde and toluene is carried out by adding paraldehyde to a well cooled mixture of toluene and sulfuric acid preferably of 90% strength, the paraldehyde preferably containing additional toluene as a diluent. The rate of addition is such that the temperature during the reaction does not increase, but is maintained fairly constant by external cooling. An excess of toluene is used, and the reaction mixture, on standing after complete reaction, settles into two layers—a hydrocarbon layer of toluene and ditolylethane and an acid layer of sulfuric acid and water. The hydrocarbon layer is separated by decantation, and the ditolylethane is recovered therefrom by fractional distillation or other suitable method. The toluene recovered from the hydrocarbon mixture is recycled to react with further paraldehyde. The process may be operated as either a batch or continuous process.

The most critical factor affecting the yield of ditolylethane by this process is the strength of the sulfuric acid used. During the reaction the sulfuric acid is diluted by the water which is formed. Hence the strength of the acid is continuously decreasing as the reaction proceeds. To maintain that strength of acid which is conducive to the highest yield of ditolylethane, it is necessary either to fortify the acid during the reaction by addition of oleum, or to start with a quantity of acid sufficiently large that its strength will not be appreciably decreased by the water formed during the reaction. We have found that sulfuric acid of about 89% to 90% strength is most conducive to high yields of ditolylethane by this reaction. (By 90% strength sulfuric acid is meant a mixture containing 90 parts by weight of $H_2SO_4$ and 10 parts by weight of water.) Acid strengths below about 87% do not promote satisfactory yields; acid strengths of 80% or lower promote no desirable reaction whatsoever between paraldehyde and toluene. Acid strengths above about 93% cause excess formation of tarry by-products during the reaction, and are undesirable for that reason.

Dilution of the sulfuric acid with inert materials such as tar, occurring during this process, apparently does not affect the "dehydrating"

strength of the acid. Thus a quantity of acid containing 81 parts $H_2SO_4$, 9 parts water, and 10 parts inert diluent has approximately the same dehydrating strength as acid containing 90 parts $H_2SO_4$ and 10 parts water. It is the "dehydrating" strength of the acid which should be kept within the range of 87% to 93% in the process of our invention.

During the operation of the process of our invention, we prefer to maintain the temperature of the reaction below 10° C., preferably below about 5° C. Temperatures about 0° C. are found to give maximum yields and hence are most desirable for this reaction.

The excess toluene used in the process may vary from 25% upwards. Preferably, an excess of about 35% to 50% is used. No significant increase in the yields of ditolylethane is obtained with amounts of toluene greater than 50% excess. In batch operation the paraldehyde is added to the toluene, so that the toluene is always present in excess during the reaction. The effects of using excess toluene are illustrated by the following figures.

A series of batches of ditolylethane was prepared by this process using 4%, 44%, and 188% excess toluene in the preparation of the various batches respectively. The yields of ditolylethane obtained, based on the amount of toluene consumed in each case, were 80%, 89%, and 90% respectively. The excess toluene was recovered and used in the same process in subsequent preparations.

As noted above, the paraldehyde to be added to the mixture of toluene and sulfuric acid is preferably diluted with toluene, thus avoiding local high concentrations of paraldehyde in the reaction mixture and ensuring a smooth, even reaction. The fraction of the total amount of toluene mixed with paraldehyde for addition to the mixture of toluene and sulfuric acid is apparently not critical, but usually comprises from about 5% to about 30% of the toluene used.

The amount of acid in the sulfuric acid-toluene mixture, as previously stated, should be sufficiently large that its strength is not decreased below the preferred range of acid-strength by water formed during reaction. A ratio of about 1.5 moles of sulfuric acid per mole of toluene in the toluene-acid mixture has been found to be adequate, where the total amount of toluene used was 40% in excess of that required for complete reaction with the paraldehyde and 14% of the toluene was added with the paraldehyde. Thus it is seen that only about four moles of sulfuric acid are required for dehydration for each mole of ditolylethane produced. This is a marked contrast with the thirty moles of sulfuric acid per mole of ditolylethane required by Fischer.

The rate of addition of paraldehyde to the mixture of sulfuric acid and toluene, according to this invention, may be as rapid as the cooling capacity of the system permits, it being required only that the temperature of the system be maintained within the range previously indicated for maximum yields.

Good agitation, such as is obtained with a propellor agitator or a turbo mixer, is required for high yields. Poor agitation and consequent poor dehydration conditions may result in yields as low as 15% due to the formation of large amounts of tarry by-products. Effective mixing, as required for obtaining the high yields possible by this process, is not difficult to obtain.

A typical batch preparation of ditolylethane illustrates the yields obtainable by this improved method. The proportions are parts by weight, except where otherwise stated.

520 parts of toluene were mixed with 890 parts of 90% sulfuric acid (i. e. 90% $H_2SO_4$ and 10% $H_2O$ by weight), and the mixture was cooled to 0° C. A mixture of 86 parts of toluene and 100 parts of paraldehyde was added portionwise to the heterogeneous mixture of sulfuric acid and toluene while stirring vigorously and maintaining the temperature of the reacting mixture at about 0° C. by external cooling.

The resulting hydrocarbon layer was separated by decantation, washed and neutralized, and the ditolylethane was separated therefrom by distillation over a temperature range of 125° C. to 130° C. at a pressure of 1 to 2 mm. of mercury. There were recovered 240 parts of toluene and 403 parts of ditolylethane representing a yield of 84% of theory based on the paraldehyde used and a yield of 96.5% of theory based on the toluene used.

The preparation of ditolylethane from acetylene and toluene with a catalyst of sulfuric acid and mercuric sulfate proceeds through the acetaldehyde stage. By operating the two stages as one process it is not possible simultaneously to work under the optimum conditions for both stages. By operating the reaction between aldehyde and toluene as a separate step, as in this invention, it is possible to work under the optimum conditions in both stages of the preparation of ditolylethane from acetylene and toluene. Hence much larger over-all yields may be obtained.

By the process of this invention, it is possible to obtain hitherto unobtainable yields of ditolylethane. Furthermore, these high yields of ditolylethane may be obtained with the use of much less catalyst sulfuric acid than has heretofore been required by this reaction. In addition, the process outlined in this invention is easily controlled and operated, either as a batch or a continuous process, thereby assuring maximum economy.

Throughout the specification, reference has been made to the paraldehyde polymeric form of acetaldehyde as an ingredient in the process of the invention. Monomeric acetaldehyde may be used in place of paraldehyde, but its use is objectionable because of the large amounts of heat liberated when it polymerizes to paraldehyde under the acid conditions of the reaction.

We claim:

1. In a process for the preparation of 1,1 di-p-tolylethane, the step of adding to a mixture of toluene and sulfuric acid of 87% to 93% strength, a mixture of toluene and paraldehyde, while maintaining the temperature of the combined mixtures below 10° C., the total amount of toluene in the mixtures being more than 25% in excess of that theoretically required for reaction with the paraldehyde, the amount of sulfuric acid being such that its strength is not decreased below about 87% by the water formed during the reaction.

2. In a process for the preparation of 1,1 di-p-tolylethane, the step as in claim 1, in which the amount of toluene in the two mixtures is from 35% to 50% in excess of that theoretically required for reaction with the paraldehyde.

3. In a process for the preparation of 1,1 di-p-tolylethane, the step as in claim 2, in which the temperature is maintained between 0° C. and 10° C.

4. In a process for the preparation of 1,1 di-p- tolylethane, the step of adding paraldehyde to a mixture of toluene and sulfuric acid of 87% to 93% strength while maintaining the temperature of the combined mixtures below 10° C., the amount of toluene being more than 25% in excess of that theoretically required for reaction with the paraldehyde, the amount of sulfuric acid being such that its strength is not decreased below 87% by the water formed during the reaction.

5. In a process for the preparation of 1,1 di-p-tolylethane, the step as in claim 4, in which the amount of toluene is from 35% to 50% in excess of that theoretically required for reaction with the paraldehyde.

6. In a process for the preparation of 1,1 di-p-tolylethane, the step as in claim 5, in which the temperature is maintained between 0° C. and 10° C.

7. A process of preparing 1,1 di-p-tolylethane comprising adding to a mixture of toluene and sulfuric acid, a mixture of additional toluene and paraldehyde, with vigorous stirring while maintaining the temperature of the combined mixtures below 10° C, the strength of the sulfuric acid being between 87% and 93% and its amount being such that its strength is not decreased below 87% by the water formed during the reaction, separating the resulting hydrocarbon layer from the acid layer, and separating 1,1 di-p-tolylethane from the hydrocarbon layer.

8. A process, as in claim 7, including separating toluene from the hydrocarbon layer and recycling the toluene for further reaction with paraldehyde in the presence of sulfuric acid.

JAMES A. McCOUBREY.
FREDERICK P. LOSSING.

REFERENCES CITED

The following references are of record in the file of this patent:

UNITED STATES PATENTS

| Number | Name | Date |
|---|---|---|
| 2,439,228 | Sturrock et al. | Apr. 6, 1948 |

OTHER REFERENCES

Fischer, O. Berichte, vol. 7 (1874), 1193-4 (2 pages).